(12) United States Patent
Yu

(10) Patent No.: US 10,740,223 B1
(45) Date of Patent: Aug. 11, 2020

(54) SYSTEMS AND METHODS FOR CHECKPOINT-BASED MACHINE LEARNING MODEL

(71) Applicant: Verizon Patent and Licensing Inc., Arlington, VA (US)

(72) Inventor: Qiao Yu, McLean, VA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 0 days.

(21) Appl. No.: 16/264,145

(22) Filed: Jan. 31, 2019

(51) Int. Cl.
| | | |
|---|---|---|
| *G06N 99/00* | (2019.01) | |
| *G06N 20/00* | (2019.01) | |
| *H04L 29/08* | (2006.01) | |
| *G06K 9/62* | (2006.01) | |
| *G06N 5/04* | (2006.01) | |
| *G06F 11/36* | (2006.01) | |

(52) U.S. Cl.
CPC ...... *G06F 11/3676* (2013.01); *G06F 11/3664* (2013.01); *G06N 20/00* (2019.01)

(58) Field of Classification Search
CPC ........ G06N 20/00; G06N 3/08; G06N 3/0454; G06N 3/0445; G06N 7/005; G06N 5/04; G06F 16/285; G06F 11/3676; G06F 11/3664; G05B 19/401; G05B 19/4097; C07K 16/2818; C12Q 1/6886; A61K 2039/505

See application file for complete search history.

(56) References Cited

U.S. PATENT DOCUMENTS

| | | | | |
|---|---|---|---|---|
| 9,886,670 | B2 * | 2/2018 | Dirac | G06N 20/00 |
| 10,318,882 | B2 * | 6/2019 | Brueckner | H04L 67/10 |
| 10,540,606 | B2 * | 1/2020 | Dirac | G06N 20/00 |
| 10,599,984 | B1 * | 3/2020 | Wubbels | G16H 50/20 |
| 2014/0279739 | A1 * | 9/2014 | Elkington | G06N 20/00 |
| | | | | 706/12 |
| 2015/0127590 | A1 * | 5/2015 | Gay | G06N 5/02 |
| | | | | 706/12 |
| 2016/0110657 | A1 * | 4/2016 | Gibiansky | G06N 20/00 |
| | | | | 706/12 |
| 2018/0150770 | A1 * | 5/2018 | Shaoib | G06N 20/00 |
| 2019/0108453 | A1 * | 4/2019 | Schwabe | G06N 20/00 |

OTHER PUBLICATIONS

Chen et al., NUMARCK: machine learning algorithm for resiliency and checkpointing, 12 pages (Year: 2014).*
Sato et al., Design and modeling of non-blocking checkpoint system, 2 pages (Year: 2012).*

* cited by examiner

*Primary Examiner* — Thuy Dao

(57) ABSTRACT

A system described herein may use automated techniques, such as machine learning techniques, to identify sequences of actions that satisfy checkpoint criteria. Different sequences of actions may be used for different iterations of the same checkpoints, and may be used to refine a model that evaluates the different sequences of actions (e.g., scores the different sequences of actions). The model may be used to simulate the same or similar actions, in order to validate or discover other sequences of actions for the same checkpoint.

20 Claims, 13 Drawing Sheets

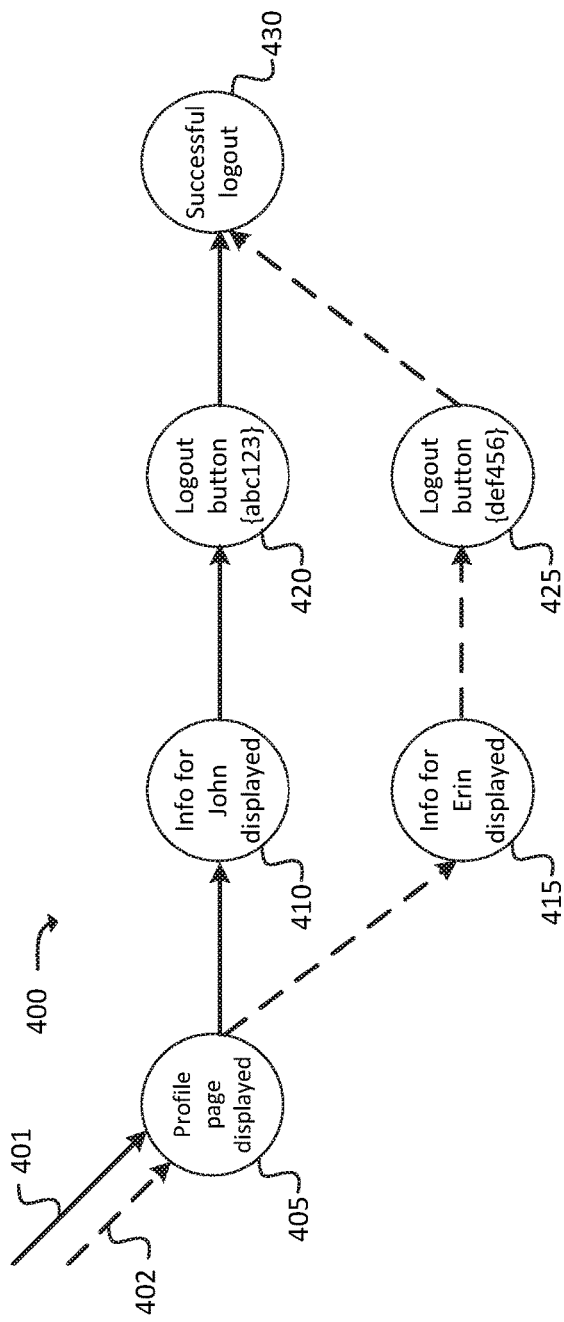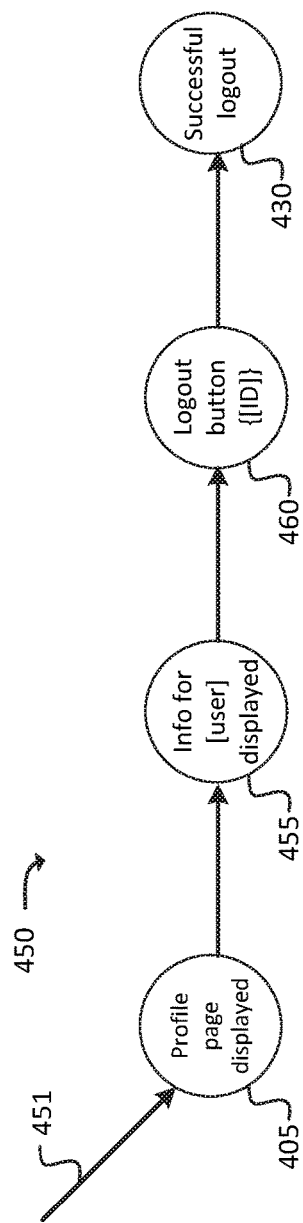

| Path ID | Path | Score | Cost |
|---|---|---|---|
| Path 501 | {N1, N2, N7, N8, N12} | 8 | $C_{P1} = C_{N1:N2} + C_{N2:N7} + C_{N7:N8} + C_{N8:N12}$ |
| Path 502 | {N1, N2, N5, N6, N9, N10} | 0 | {null} |
| Path 503 | {N1, N7, N3, N8, N11, N12} | 92 | $C_{P2} = C_{N1:N7} + C_{N7:N3} + C_{N3:N8} + C_{N8:N11} + C_{N11:N12}$ |

SYSTEMS AND METHODS FOR CHECKPOINT-BASED MACHINE LEARNING MODEL

BACKGROUND

Machine learning techniques may be used in software testing environments in order to analyze sets of data and form models, such as predictive models. For example, scripting may be used to automate interactions with a software testing environment in order to simulate how human users may interact with the software testing environment, and to potentially determine how the software responds to human interactions.

BRIEF DESCRIPTION OF THE DRAWINGS

FIGS. 4A and 4B conceptually illustrate an example of different sets of actions, represented as paths between nodes, that may result in the completion of a checkpoint;

DETAILED DESCRIPTION OF THE PREFERRED EMBODIMENTS

The following detailed description refers to the accompanying drawings. The same reference numbers in different drawings may identify the same or similar elements.

Embodiments described herein may provide for a checkpoint-based machine learning model. For example, in software testing systems, automation may be used to simulate user interactions and/or programmatic responses to the user interactions. The automation may, in some scenarios, be modeled after actual human interactions (e.g., may be determined based on machine learning, artificial intelligence ("AI"), statistical analysis, etc. techniques performed on a set of data that reflects actual human interactions with a given system).

Figure 1A:
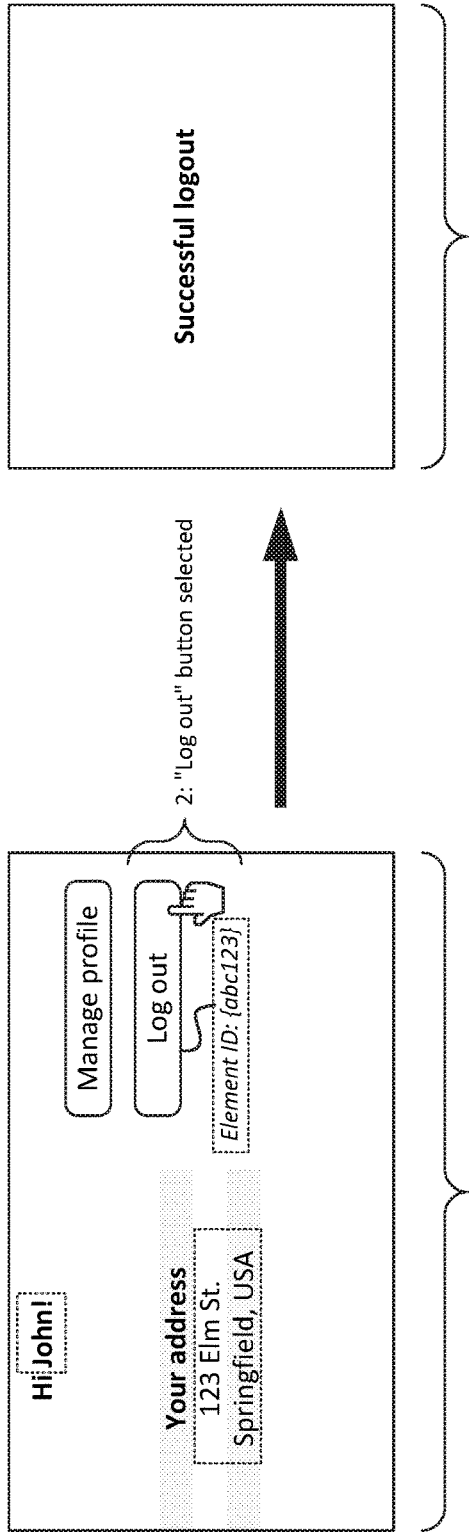
FIGS. 1A and 1B illustrate an example scenario in which changes to parameters of a software testing environment may be addressed by one or more embodiments described herein.

For example, as shown in FIG. 1A, a first set of data relating to interactions with a particular system may include information indicating that a profile page is displayed. As shown, the profile page may include a name of a user ("John"), an address for the user ("123 Elm St., Springfield, USA"), a "Manage profile" button, and a "Log out" button. The dashed boxes in the figure represent elements that may be different from another example described below with respect to FIG. 1B. As further shown, the "Log out" button may have an Element Identifier ("ID") of "{abc123}". The Element ID may, for example, be a programmatic code (e.g., "source" code) that represents the button and is used by a device or system to identify the presented button and/or differentiate the button from other elements (e.g., other graphical and/or interactable elements) in the profile page. For example, while not explicitly shown here, the "Manage profile" button may have another Element ID, while the text "Hi John!" may have yet another Element ID.

As further shown, the first set of data may indicate that the "Log out" button (i.e., the element having the Element ID "{abc123}" was selected, and that a logout page was subsequently displayed. The first set of data may be based on, for example, image recognition, text parsing, pattern recognition, tracking of user interactions, and/or other automated techniques that can be used to suitably determine what interactions were received and/or what was presented by the particular system. The tracking may be performed with express user consent, and any stored or collected data may be subject to review and/or deletion upon the user's request.

For instance, image recognition and/or text parsing may be used to identify the text "Hi John," and parsing of source code of the profile page (e.g., in conjunction with image recognition to identify the "Log out" button) may be used to identify the Element ID of the "Log out" button. Further, suitable techniques may be used to identify that the "Log out" button was selected (i.e., subject to the consent of the user as well as the opportunity to review and/or delete any such tracked data). Similar techniques may be used to determine that the logout page was displayed (e.g., textual and/or image recognition may be used to determine that "Successful logout" was displayed). As described herein, the displaying of the logout page may be a checkpoint in an automated environment, in which it may be an objective of a given automated test to reach the logout page (e.g., where "Successful logout" is displayed).

Figure 1B:
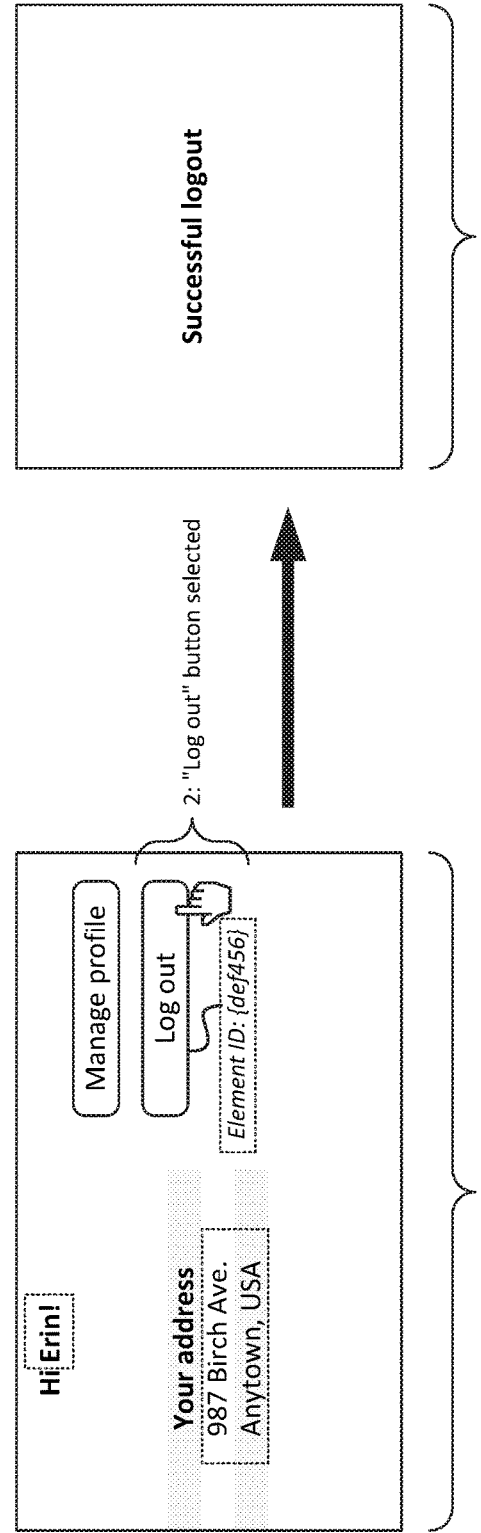

FIG. 1B illustrates a second set of data, that may represent another example scenario in which similar elements are presented, and similar interactions (e.g., user interactions) are detected. For instance, the second set of data may indicate that a profile page was displayed, a "Log out" button was selected, and a logout page was displayed.

However, as indicated by the dashed boxes both FIGS. 1A and 1B, some differences may be present between the profile pages for the different users. For example, while the profile page of FIG. 1A says "Hi John!", the profile page of FIG. 1B may say "Hi Erin!" Also, while the profile page of FIG. 1A may have the Element ID of "{abc123}" for the "Log out" button, the profile page of FIG. 1B may have the Element ID of "{def456}" for the "Log out" button. The difference may be due to design of the profile page (e.g., where the profile page was designed such that the "Log out" button would have different unique Element IDs for different users) and/or some other factor.

In some scenarios, these differences may suggest that the interactions were different, and/or that the information that was presented by the system was different. For example, while in FIG. 1A Element ID "{abc123}" was selected, Element ID "{def456}" was selected. This may be identified as a difference, due to the differing Element IDs. However, in actuality, it may be desirable to consider both sets of sequences of interactions and/or displayed information (i.e., as shown in FIGS. 1A and 1B, respectively) as both being equivalent or similar, inasmuch as both sets of sequences of interactions and/or displayed information may end in the same result (i.e., the logout page, in this example).

In accordance with embodiments described herein, these outcomes (e.g., results of sequences of actions and/or programmatic responses to such actions) may be referred to as "checkpoints." That is, a checkpoint may be considered "satisfied" or "complete" when a particular criteria, or set of criteria, is met. Thus, in the examples of FIGS. 1A and 1B, the display of the logout page may be a checkpoint, in accordance with some embodiments. As described herein, despite the differences that may otherwise have been identified by other techniques as distinguishing the actions shown in FIGS. 1A and 1B, embodiments described herein may determine that these different actions may result in the same checkpoint.

Furthermore, once identified as being different sets of actions that result in the completion of the checkpoint, these sets of actions may be used to generate and/or modify automated testing of similar systems, and to properly detect whether the automation was completed successfully. For example, instead of determining that an automated test failed because a given Element ID was not selected, embodiments described herein may determine that the automated test did not fail so long as the checkpoint was completed (e.g., the logout page was displayed), even if the same actions were not performed to complete the checkpoint (e.g., different Element IDs were selected).

Figure 2A:
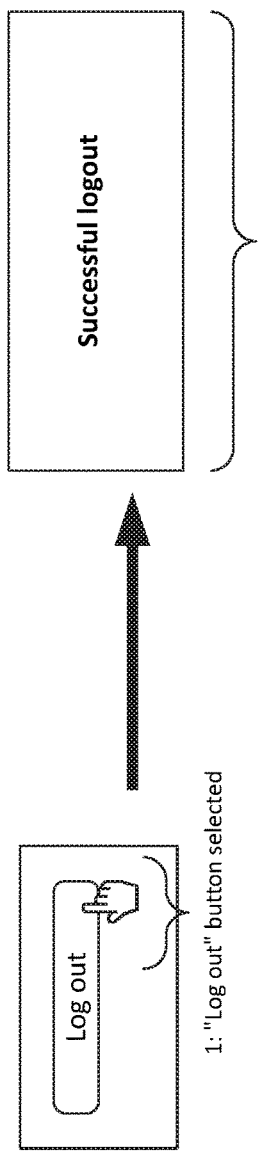
FIGS. 2A and 2B illustrate an example scenario in which changes to parameters of a software testing environment, which may necessitate additional actions, may be addressed by one or more embodiments described herein.
Figure 2B:
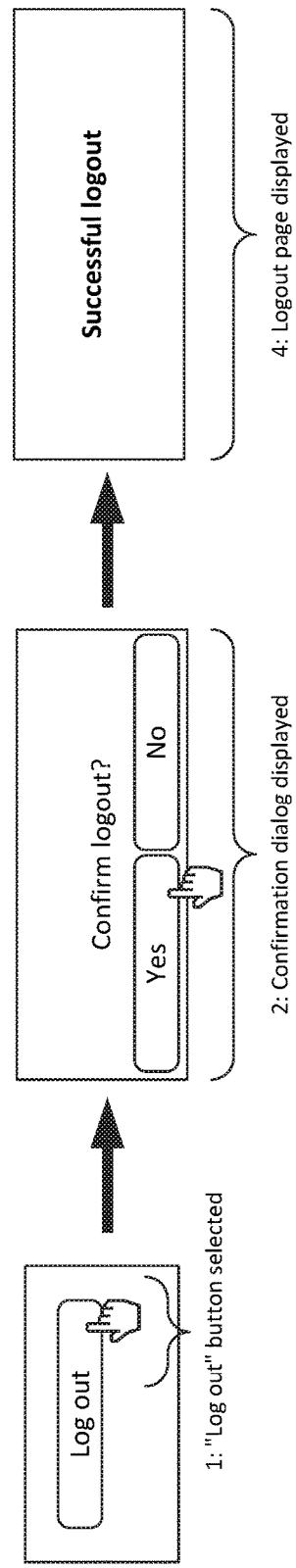

FIGS. 2A and 2B illustrate an example scenario in which two sets of actions include a different quantity of actions to complete the same checkpoint. For example, as shown in FIG. 2A, a "Log out" button may be selected, and a logout page may be displayed in response. In FIG. 2B, however, a confirmation dialog may be displayed, and a "Yes" button may be selected prior to the display of the logout page.

As described herein, some embodiments may determine that both sets of actions (e.g., as respectively shown in FIGS. 1A and 1B) may result in the completion of the same checkpoint (e.g., the displaying of the logout page). Some embodiments may use this information in, for example, automated testing environments in which simulated actions may occur. The system with which the actions may occur may change (e.g., due to revisions in a design of the system, such as the addition or removal of elements with which to interact, such as the addition of a confirmation dialog, as shown in FIG. 2B), such that different actions may be performed to complete the same checkpoint. Embodiments described herein may determine that the automated test did not fail so long as the checkpoint was completed (e.g., the logout page was displayed), even if different quantities of actions were performed and/or different elements were interacted with.

Figure 3:
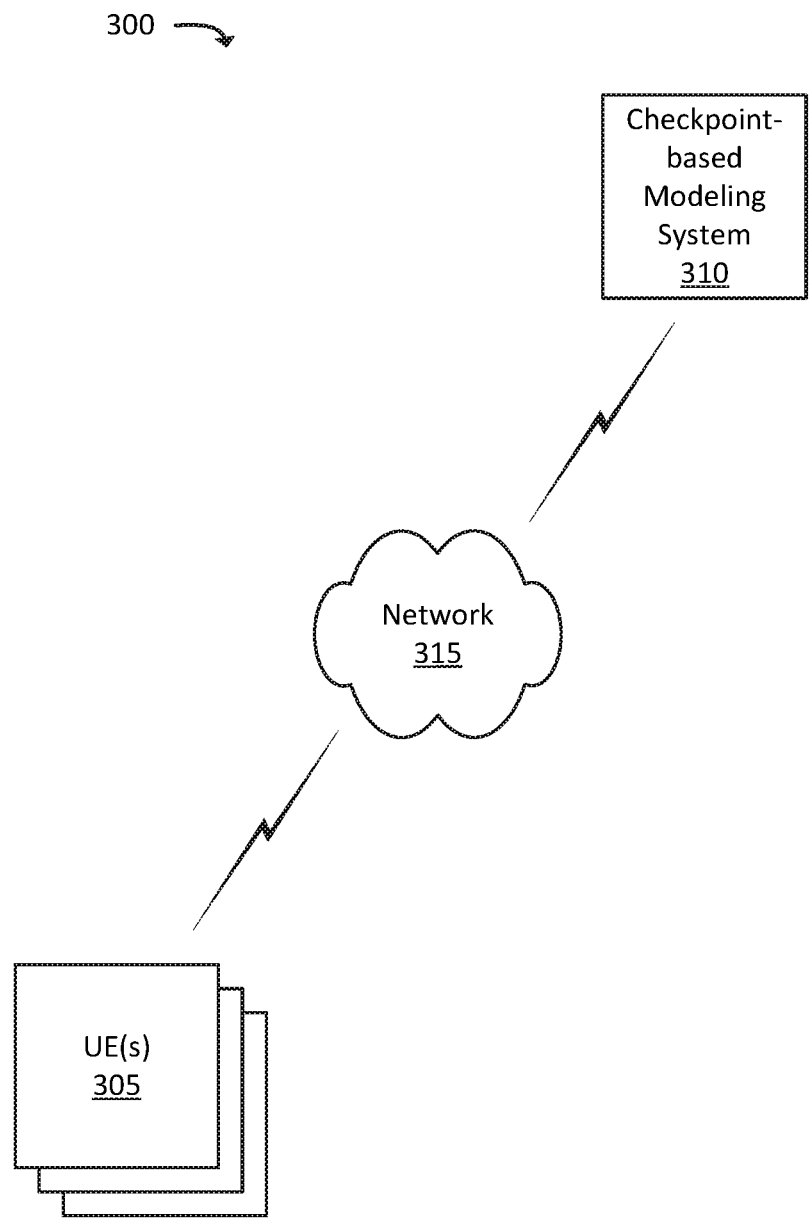
FIG. 3 illustrates an example environment in which one or more embodiments, described herein, may be implemented.

FIG. 3 illustrates an example environment 300, in which one or more embodiments, described herein, may be implemented. As shown in FIG. 3, environment 300 may include one or more user devices 305, Checkpoint-based Modeling System ("CMS") 310, network 315. The quantity of devices and/or networks, illustrated in FIG. 3, is provided for explanatory purposes only. In practice, environment 300 may include additional devices and/or networks; fewer devices and/or networks; different devices and/or networks; or differently arranged devices and/or networks than illustrated in FIG. 3. For example, while not shown, environment 300 may include devices that facilitate or enable communication between various components shown in environment 300, such as routers, modems, gateways, switches, hubs, etc. Alternatively, or additionally, one or more of the devices of environment 300 may perform one or more functions described as being performed by another one or more of the devices of environments 300. Devices of environment 300 may interconnect with each other and/or other devices via wired connections, wireless connections, or a combination of wired and wireless connections. In some implementations, one or more devices of environment 300 may be physically integrated in, and/or may be physically attached to, one or more other devices of environment 300.

User device 305 may include any computation and communication device that is capable of communicating with one or more networks (e.g., network 315). For example, user device 305 may include a device that receives content, such as web pages (e.g., that include text content and/or image content), streaming audio and/or video content, and/or other content, via an Internet connection and/or via some other delivery technique. User device 305 may also receive user interactions (e.g., voice input, touches on a touchscreen, "clicks" via an input device such as a mouse, etc.). In some implementations, user device 305 may be, or may include, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

CMS 310 may include one or more devices (e.g., a server device or a distributed set of devices, such as a cloud computing system) that perform one or more actions described herein. For example, CMS 310 may receive information regarding user interactions performed at or received by one or more UEs 305, and/or programmatic actions or computations performed by one or more UEs 305 (e.g., in response to user interactions, and/or independent of user interactions, such as scripted simulations or actions determined via machine learning, artificial intelligence, or other techniques). CMS 310 may also, as described herein, generate information that can be used (e.g., in machine learning, artificial intelligence, and/or other techniques) to predict, validate, or simulate sets of actions.

Network 315 may include one or more radio access networks ("RANs"), via which user devices 305 may access one or more other networks or devices, a core network of a wireless telecommunications network, an IP-based packet data network ("PDN"), a wide area network ("WAN") such as the Internet, a private enterprise network, and/or one or more other networks. In some implementations, network 315 may be, include, or be in communication with a cellular network, such as a Long-Term Evolution ("LTE") network, a Third Generation ("3G") network, a Fourth Generation ("4G") network, a Fifth Generation ("5G") network, a Code Division Multiple Access ("CDMA") network, etc. User device 305 may connect to, and/or otherwise communicate with, via network 315, data servers, application servers, other user devices 305, etc. Network 315 may be connected to, and/or otherwise in communication with, one or more other networks, such as a public switched telephone network ("PSTN"), a public land mobile network ("PLMN"), and/or another network.

FIG. 4A conceptually illustrates, by way of node graph 400, an example of different sets of actions that may result in either the completion of a checkpoint or the non-completion of the checkpoint. The node graph example is used herein for illustrative purposes, and is not intended to limit certain embodiments to the actual use of a node graph. That is, concepts illustrated by the node graph may be practiced, in accordance with some embodiments, without actually constructing, analyzing, or otherwise using a node graph.

As discussed in the context of this figure, "nodes" may refer to identifiable attributes and/or states (e.g., attributes and/or states of a programmatic system, such as a graphical user interface and/or some other system), and/or actions (where an "action" may refer to identifiable factors or criteria, such as factors that cause a change or transition from one node to another). For example, one node (or action) may represent the detection of a set of information displayed on a graphical user interface, while another node (or action) may represent the detection of a different set of information displayed in the same or a different graphical user interface.

FIG. 4A also shows example paths 401 and 402, where a "path" represents a discrete iteration through a set of actions. For example, path 401 (represented by the solid line) may represent the sequence of actions shown in FIG. 1A, while path 402 (represented by the dashed line) may represent the sequence of actions shown in FIG. 1B. The actions represented by node graph 400 may be based on user interactions (e.g., selections made by users) and/or based on automated interactions (e.g., selections made programmatically by an automated/scripted system).

For example, node 405 in FIG. 4 may represent the display of a profile page (such as the pages shown in FIGS. 1A and/or 1B), or identifiable attributes of the profile page (e.g., a Uniform Resource Locator ("URL"), Element ID, and/or some other programmatic identifier of the profile page). The profile page may have been identified using, for example, an image recognition technique (e.g., to identify that a given profile page is visually similar or identical to how a profile page would be expected to look), parsing text content of the page (e.g., identifying that some or all of the text, such as "Hi John!" is similar or identical to text that would be expected on a profile page), and/or some other programmatic technique (e.g., parsing a URL or Element ID of the page to determine that the URL and/or Element ID matches, or partially matches, an expected URL or Element ID of a profile page). Both paths 401 and 402 may be shown as "entering" node 405, as paths 401 and 402 may be indistinct at the point in time represented by node 405.

Nodes 410 and 415 may represent different elements on the profile page. For example, as mentioned above, the profile pages of FIGS. 1A and 1B may display different information, such as "Hi John!" and "Hi Erin!" Thus, path 401 may exit node 405 and enter node 410 (which may represent the information for John being displayed) while path 402 exits node 405 and enters node 415 (which may represent the information for Erin being displayed). The differing information (e.g., as represented by nodes 410 and 415) may be determined based on image recognition, text parsing, and/or other types of techniques.

As additionally shown, path 401 may exit node 410 and exit node 420, which may represent the selection of the "Logout" button having Element ID "{abc123}" (e.g., as shown in FIG. 1A), and path 402 may exit node 415 and enter node 425, which may represent the selection of the "Logout" button having Element ID "{def456}". As further shown in FIG. 4A, paths 401 and 402 may exit nodes 420 and 425, respectively, and enter node 430, which may represent the same logout screen. That is, once path 401 has traversed nodes 405, 410, and 420, path 401 may reach node 430, and once path 402 has traversed nodes 405, 415, and 425, path 402 may also reach the same node 430. Node 430 may represent a logout screen which is indistinct for both paths (e.g., may include the same text or images, may be located at the same URL, and/or may be identical or similar in other ways).

As described herein, both paths 401 and 402 may be "valid," in that these paths both start and end at indistinct nodes. The identification that these paths 401 and 402 start and end at indistinct nodes may be useful in, for example, testing or scripting scenarios where it is necessary to determine whether a set of actions are valid or invalid. Embodiments described herein may determine that these paths are both valid, while other systems may determine that one (or both) of these paths are invalid, because variations exist in the paths.

FIG. 4B illustrates node graph 450, which conceptually illustrates the condensing of paths 401 and 402 (and their different nodes) into a single path 451. For example, path 451 may enter node 405, and then node 455. Node 455 may represent nodes 410 and 415, but with the identified differences between nodes 410 and 415 being either ignored or less heavily weighted, while the similarities are used to determine that these nodes can be condensed into a single node 455. For example, it may be determined that nodes 410 and 415 both follow the same pattern (e.g., displaying "Hi [name]!" and an address for each user), and these nodes therefore can be condensed into node 455. Similarly, nodes 420 and 425 may be condensed into node 460, which may represent a "Logout" button, but with the Element ID of the "Logout" button not being determined as a difference between the two buttons. Path 451 may exit node 460, and enter 430 (e.g., where paths 401 and 402, of FIG. 4A, converge). In this manner, node graph 450 of FIG. 4B may be considered an alternative, or refined, representation of node graph 400 of FIG. 4A.

Figure 5:
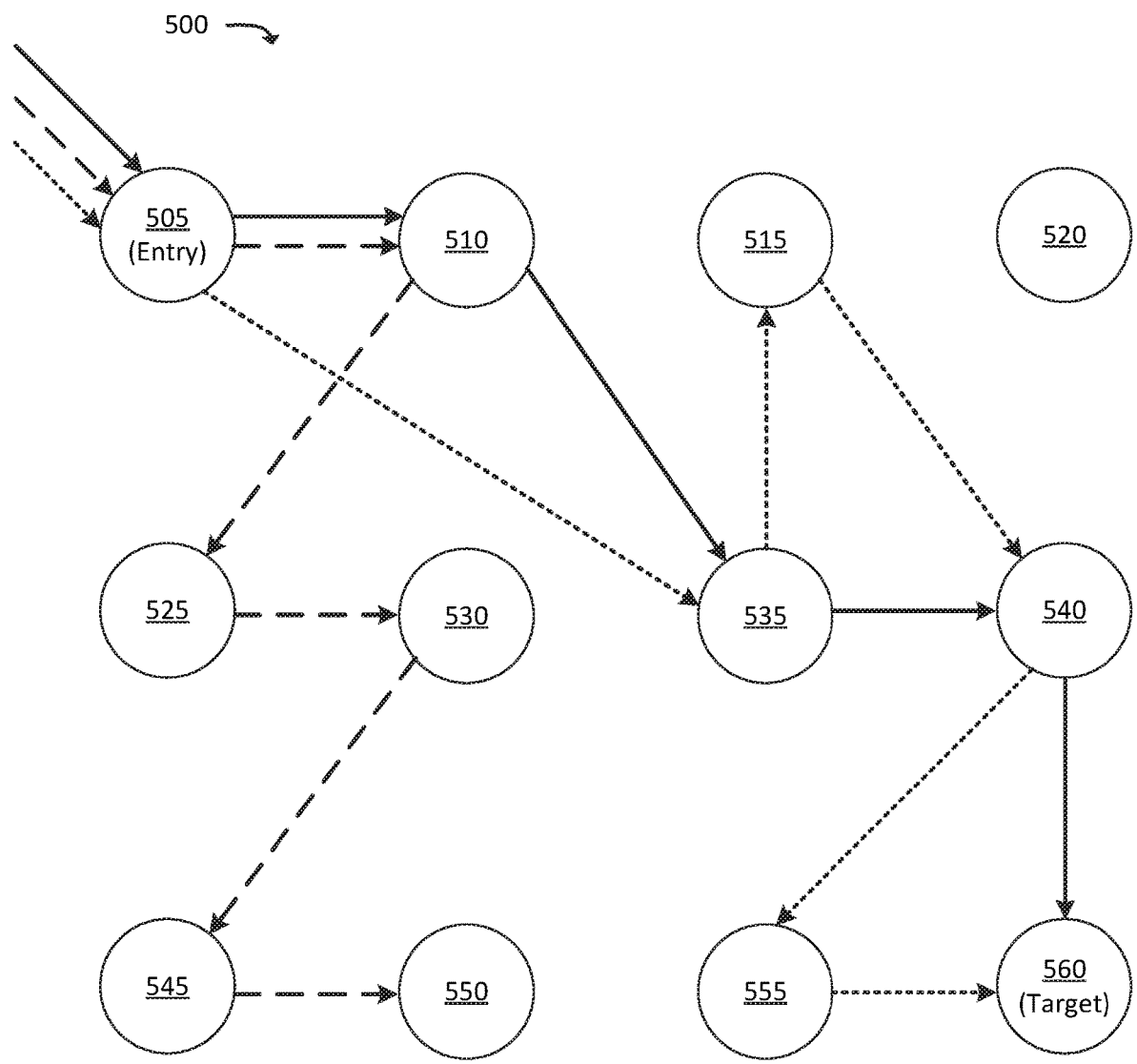
FIG. 5 conceptually illustrates an example of different sets of actions, represented as paths between nodes, that may result in either the completion of a checkpoint, as well as sets of actions that do not result in the completion of the checkpoint.

FIG. 5 illustrates another node graph 500, which includes paths 501, 502, and 503. In node graph 500, node 505 may be the entry point (e.g., the point that all paths begin) and node 560 may be the target exit point (e.g., the point which, if a path reaches, the path is considered valid). For the sake of explanation, the nodes of node graph 500 are not described in the context of any particular set of actions. As shown, paths 501, 502, and 503 may all enter node 505. Paths 501 and 502 may enter node 510 from node 505. Path 501 may proceed to traverse nodes 535, 540, and 560. Since path 501 reaches node 560, path 501 may be considered valid. Path 502 may proceed from node 510 to nodes 525, 530, 545, and 550. Because path 502 does not reach node 560, path 502 may be considered invalid. Path 503 may traverse nodes 535, 515, 540, 555, and 560. Because path 503 reaches node 560, path 503 may be considered valid. Thus, paths 501 and 503 may be valid, while path 502 is invalid.

Figures 6, 7:
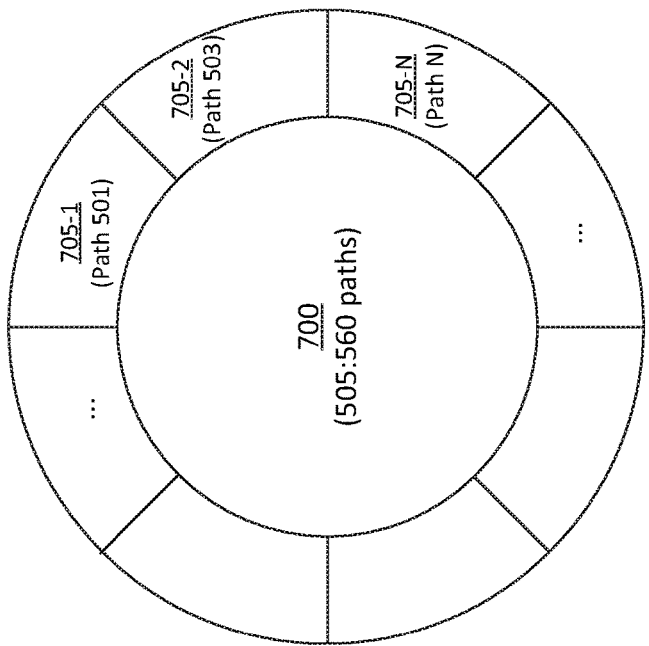
FIG. 6 illustrates an example data structure that represents the paths shown in FIG. 5, as well as scores or other computed values respectively associated with the paths.
FIG. 7 illustrates an example data structure (e.g., a "ring node" in accordance with some embodiments) that represents paths, shown in FIG. 5, that result in the completion of the checkpoint.

While shown here, node 520 may not be traversed by any of the example paths 501, 502, or 503. However, node 520 may be a node that represents FIG. 6 represents, in the form of table 600, paths 501, 502, and 503. Each row of table 600 may include the nodes of each path. In some embodiments, table 600 may include additional information for each path, such as a score, a cost, and/or other information (not illustrated). The score may be computed based on one or more factors, including popularity, relevance, incidence, and/or other factors. For example, in situations where paths 501 and 503 represent observed user interactions with a system, the score of 92 may indicate that path 503 accounts for 92% of valid paths, while the score of 8 may indicate that path 501 accounts for 8% of valid paths. In practice, these scores may be computed differently, including weighting the scores differently based on different factors. In some embodiments, a cost may be calculated, where each node is associated with either the same cost or a different cost. The "cost" for a node may be reflective of, for example, an amount of time that taken to traverse the node, an amount of resources (e.g., processing resources, network resources, etc.) consumed when traversing the node, and/or some other measure of cost.

In some embodiments, table 600 may also store information indicating that path 502 was invalid (e.g., has a score of 0, a cost of "{null}", and/or some other suitable notation). The information indicating that path 502 was invalid may be stored so that a system that tests and/or otherwise uses the valid paths may avoid using path 502.

FIG. 7 illustrates an example data structure (e.g., ring node 700), in accordance with some embodiments, that represents paths that result in the completion of a checkpoint (e.g., a traversal from a given starting node to a target end node). As shown, ring node 700 may represent a set of valid paths from starting node 505 to target end node 560 (denoted in the figure as "505:560 paths"). Each sub-node of ring node 700 may represent a given valid path. For example, sub-node 705-1 may represent path 501, sub-node 705-2 may represent path 503, sub-node 705-N may represent path N (where path N is another valid path not previously discussed above). As described below, different ring nodes may be "chained" together, such that paths between ring nodes may themselves be considered paths between nodes.

Figure 8:
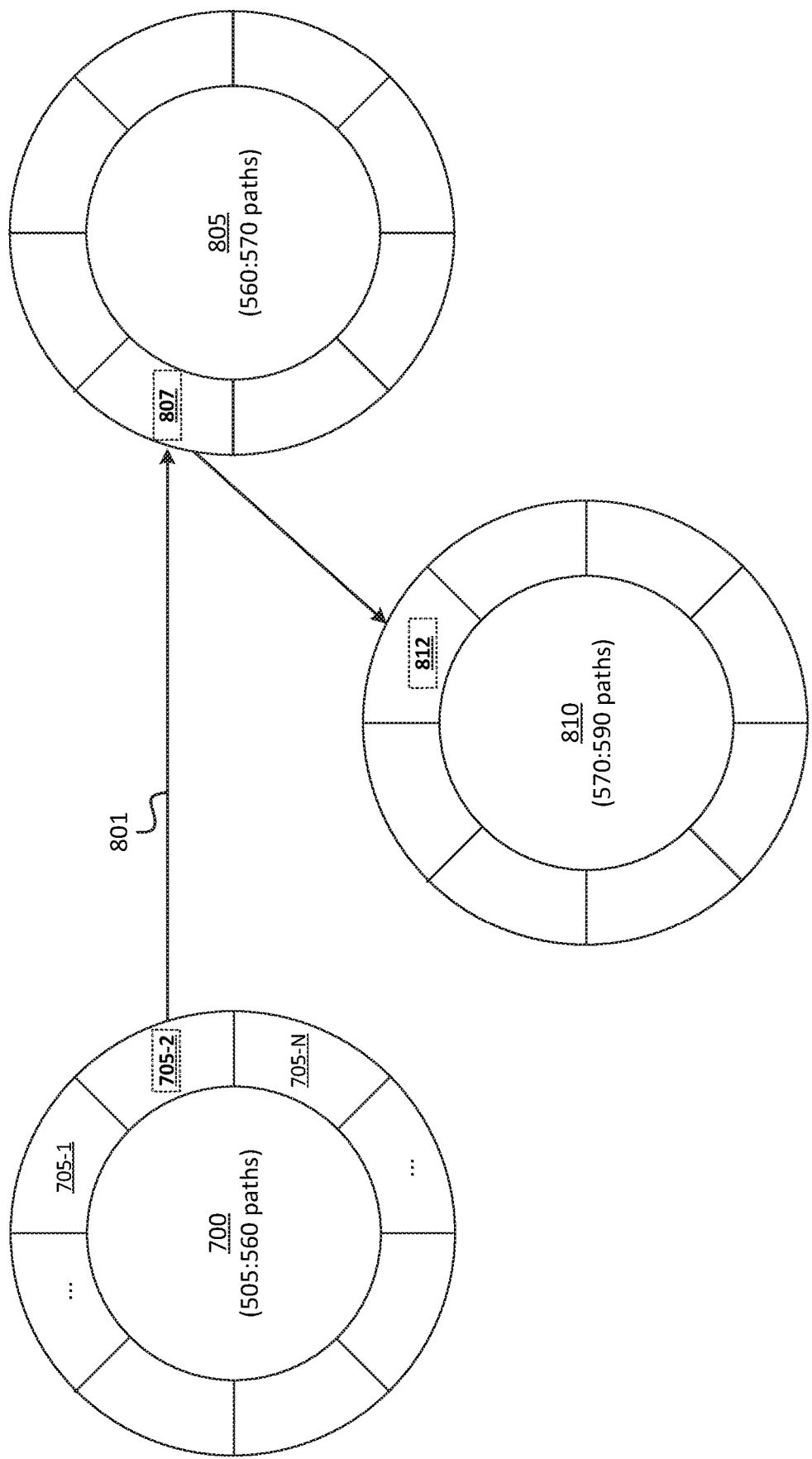
FIG. 8 conceptually illustrates paths between different ring nodes.

For example, as shown in FIG. 8, path 801 may traverse ring node 700, ring node 805, and ring node 810. As noted above, ring node 700 may represent valid paths from node 505 to node 560. Ring node 805 may represent valid paths from a beginning node that is the same as the ending node of ring node 700 (e.g., node 560) and another node that is the target end node of ring node 805 (e.g., node 570, in this example). Additionally, ring node 810 may represent valid paths from node 570 to end node 590).

Specifically, in this example, sub-node 705-2 of ring node 700 may be traversed, sub-node 807 of ring node 805 may be traversed, and sub-node 812 of ring node 810 may be traversed. In this manner, when evaluating the validity of a given path (or set of paths), flexibility is provided to allow for situations where different paths are taken to arrive at a target end node. Additionally, the end nodes for a given ring node may be considered "checkpoints," where the successful completion of the end node of a ring node may indicate that the ring node was traversed successfully. On the other hand, if a given path does not satisfy any sub-nodes (e.g., paths) of a given ring node, it may be determined that that path is invalid.

Thus, for instance, FIG. 8 illustrates a traversal of ring nodes 700, 805, and 810 via sub-node (e.g., path) 503 of rig node 700, sub-node 807 of ring node 805, and sub-node 812 of ring node 810. In some embodiments, path 801 may be the result of a machine learning and/or artificial intelligence-based simulation and/or predictive technique. For instance, a set of paths of ring node 700 may be tested, attempted, simulated, etc., before determining that sub-node 503 should be used, a set of paths of ring node 805 may be tested, attempted, simulated, etc., before determining that sub-node 807 should be used, etc.

Figure 9:
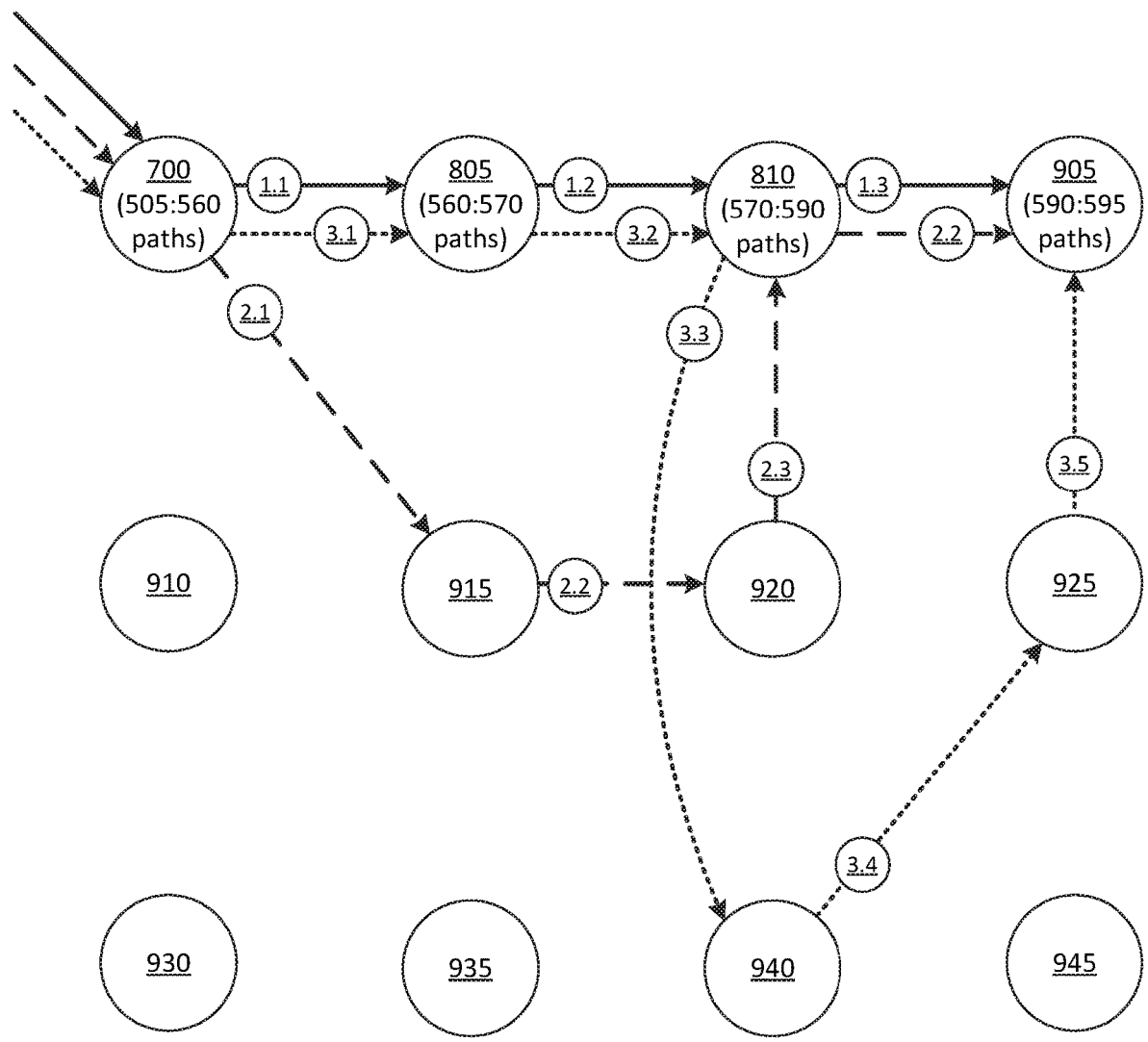
FIG. 9 conceptually illustrates examples of different sets of actions, represented as paths between ring nodes, that may result in the completion of a checkpoint (e.g., which may be considered a composite of multiple other checkpoints)

As shown in FIG. 9, ring nodes themselves may be evaluated as nodes, similar to the technique shown in FIG. 5. For example, while the nodes shown in FIG. 5 may not necessarily be ring nodes, FIG. 9 illustrates that ring nodes can themselves be starting and target end nodes (e.g., checkpoints). As shown, for instance, path 901 traverses ring node 700, ring node 805, ring node 810, and ring node 905. In this example, ring node 905 is the target end node, and path 901 is therefore considered valid. The other illustrated paths (i.e., paths 902 and 903) would also be considered valid, as these paths also start at the beginning node (e.g., ring node 503) and end at the target end node (e.g., ring node 915).

In this manner, ring nodes may build upon each other in order to form, analyze, simulate, test, etc. complex or large sets of data. In some embodiments, the hierarchical use of ring nodes may have practical applications, such as image processing (e.g., where a first level of ring nodes may be used to detect colors or patterns of an image at the pixel level, the next level of ring nodes may be used to detect shapes (e.g., based on specific sets of detected colors or patterns at the pixel level, and/or relationships between detected colors or patterns), the next level of ring nodes may be used to detect objects in the image (e.g., based on relationships between the shapes), the next level of ring nodes may be used to determine a classification for the image (e.g., based on the objects detected and/or spatial relationships between the objects), and so on). Another practical application may be testing user interactions with a graphical user interface (e.g., where a first level of ring nodes may be used to detect clicks on a single graphical user interface, the next level of ring nodes may be used to detect a set of graphical interfaces that were interacted with by a user, the next level of ring nodes may be used to determine whether the user was satisfied with the user experience, and so on).

Figure 10:
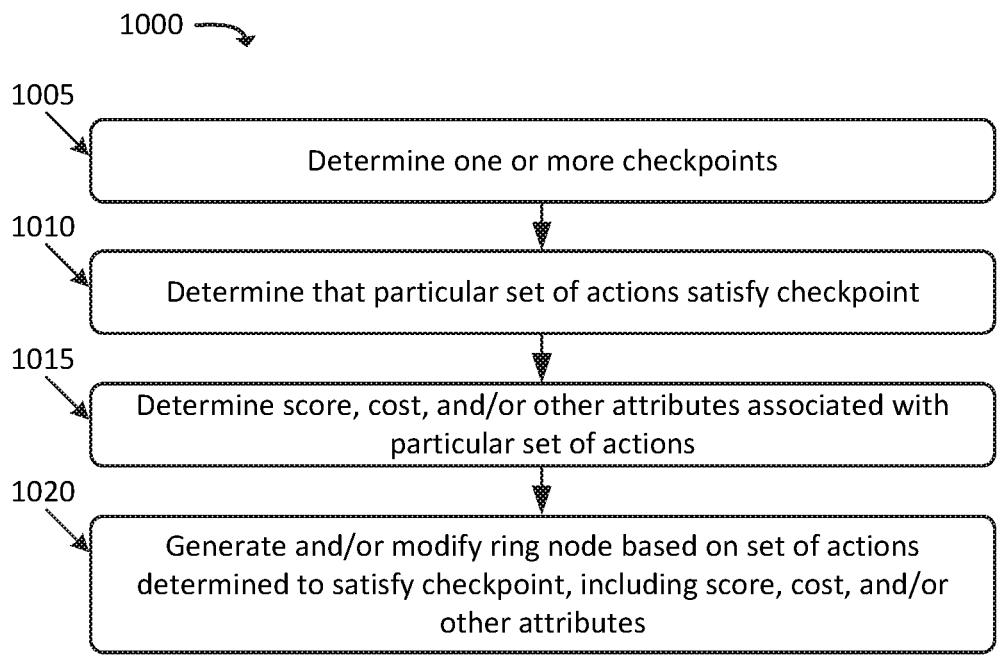
FIG. 10 illustrates an example process for generating and/or modifying a ring node based on sets of actions that satisfy a given checkpoint.

FIG. 10 illustrates an example process 1000 for generating and/or modifying a ring node based on sets of actions that satisfy a given checkpoint. In some embodiments, process 1000 may be performed by CMS 310. In some embodiments, process 1000 may be performed by one or more other devices in addition to, or in lieu of, CMS 310.

As shown, process 1000 may include determining (at 1005) one or more checkpoints. Checkpoints may represent identifiable actions, criteria, or attributes that, if identified, indicate that a target action has been performed and/or that a target state has been reached. For instance, a checkpoint may be the displaying of a particular graphical user interface (and/or a particular element or set of elements within a graphical user interface, such as particular text, particular images or colors, particular video content, particular audio content), the execution of a particular set of machine code, the computation of data, the generating of a report or alert, the receipt of a notification that an action was completed, etc. In some embodiments, determining the checkpoint may include determining beginning criteria (e.g., a starting state for the checkpoint) and an ending criteria (e.g., criteria that, if satisfied, indicate that the checkpoint has been completed).

Checkpoints may be determined manually (e.g., specified by a user of CMS 310) and/or determined programmatically (e.g., via machine learning, artificial intelligence, and/or via other techniques). For instance, a machine learning technique may be used to identify that the displaying of a particular graphical user interface element (e.g., text that reads "Successfully logged out") is associated with a positive user experience. For example, if a relatively large proportion of users, in a given set of users, closed a web browser window after the particular graphical user interface element was displayed in the web browser window, it may be inferred or determined that the display of that particular graphical user interface element is a target graphical user interface element, and that a checkpoint should be created that represents the display of the particular graphical user interface element.

Process 1000 may additionally include determining (at 1010) that a particular set of actions satisfy the checkpoint. For example, CMS 310 may determine a set of actions that were taken, in one or more iterations, to reach the checkpoint. An "iteration" may refer to a discrete set of actions that were performed. For example, a user performing a sequence of actions may be considered one iteration, another user performing another sequence of actions may be considered another iteration, an automated simulation performing another sequence of actions may be considered yet another iteration, and so on. As discussed above, a set of actions may be represented by, or conceptually considered as, a path through a set of nodes in a node graph. As also discussed above, different sets of actions (e.g., paths through conceptual nodes) may result in the successful completion of the checkpoint (e.g., reaching a target node). The different actions may, in some scenarios, include different quantities of actions (e.g., referring to the examples of FIGS. 2A and 2B, systems may change such that additional actions are required to be, or may optionally be, performed in order to reach the same checkpoint).

Process 1000 may further include determining (at 1015) a score, cost, and/or other attributes associated with the determined set of actions. For example, as mentioned above, a score may indicate a popularity, relevance, incidence, and/or some other measure associated with a given set of actions. For example, if a first set of actions (e.g., the same path, if conceptually represented by way of a node graph) were performed in more iterations than a second set of actions (where both sets of actions satisfy a particular checkpoint), CMS 310 may associate the first set of actions with a higher score than the second set of actions. As another example, CMS 310 may associate a given set of actions with a cost, which may be based on factors such as the amount of time that elapse from the beginning of the set of actions until the set of actions is complete (e.g., completes a checkpoint), the amount of resources (e.g., processing resources, network resources, storage resources, etc.) consumed by the set of actions, and/or other factors.

Process 1000 may additionally include generating and/or modifying (at 1020) a ring node based on the set of actions determined to satisfy the checkpoint. For example, CMS 310 may modify a ring node, associated with the checkpoint, to include a sub-node that represents the set of actions. In some embodiments, the sub-node may include the score, cost, and/or other attributes (determined at 1015). In scenarios where a sub-node already exists in the ring node that represents the set of actions, CMS 310 may modify the sub-node based on detecting the present iteration of the set of actions (e.g., may increase the score for the sub-node, and/or decrease scores associated with other sub-nodes of the ring node). In situations where a ring node does not already exist for the checkpoint, CMS 310 may generate a ring node for the checkpoint, and may include a sub-node in the generated ring node to represent the set of actions.

In some embodiments, CMS 310 may generate a graphical representation of the ring node. For example, CMS 310 may generate a graphical representation that is similar to the examples shown in FIGS. 7 and/or 8. The graphical representation for the ring node may include an indication or description of the sub-nodes (e.g., actions) of the ring node.

Figure 11:
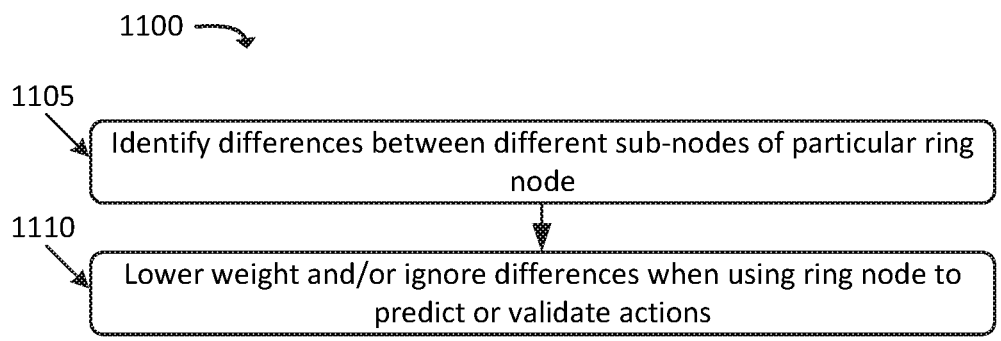
FIG. 11 illustrates an example process for refining a ring node by lowly weighting or ignoring differences between sub-nodes of the ring node.

FIG. 11 illustrates an example process 1100 for refining ring nodes to account for differences between sub-nodes. In some embodiments, process 1100 may be performed by CMS 310. In some embodiments, process 1100 may be performed by one or more other devices in addition to, or in lieu of, CMS 310.

As shown, FIG. 11 may include identifying (at 1105) differences between different sub-nodes of a particular ring node. Referring, for instance, to the example shown in FIGS. 4A and 4B, CMS 310 may identify that some attributes of the actions of actions 410 and 415 are identical, while other attributes of actions 410 and 415 are different. While discussed in the context of two different sets of actions (e.g., paths 401 and 402), similar concepts may apply in much larger data sets, such as 100 sets of actions, 100,000 sets of actions, etc., where each action, of the set of actions, has one or more attributes in common with some or all of the other actions of the set of actions, and one or more attributes that are unique and/or are not shared by one or more of the other actions of the set of actions.

As mentioned above, in this scenario, CMS 310 may identify (e.g., using machine learning, artificial intelligence, pattern matching, and/or other techniques) that actions 410 and 415 share attributes relating to the display of profile information for a user (e.g., by identifying that a user's name is displayed on a graphical user interface, identifying that a user's address is displayed in the graphical user interface, by identifying that a layout and/or color scheme of the graphical user interface matches a previously-identified layout or color scheme associated with a profile page, and/or other factors).

CMS 310 may also identify differences between the sub-nodes that share the same or similar attributes. In doing so, CMS 310 may identify a pattern of which attributes vary, or may vary, between the sub-nodes. For instance, referring again to the example shown in FIGS. 4A and 4B, CMS 310, CMS 310 may determine that the different attributes include the actual values for the users' names and/or addresses, in view of the above-mentioned recognition that the example graphical user interfaces include users' names and/or addresses.

Process 1100 may also include lowering (at 1110) a weight and/or ignoring the determined differences when using the ring node (e.g., to predict, simulate, or validate sets of actions). For example, as described below, a ring node may be used in various ways, which may include utilizing multiple different sub-nodes of the ring node. In situations where recognizable differences are determined (e.g., where different values of information are present, but are the same type, such as different user names or addresses), CMS 310 may condense multiple sub-nodes (e.g., paths) into one modified sub-node, which reflects the recognizable differences. For example, as shown in FIG. 4B, instead of two sub-nodes that represent paths 401 and 402, CMS 310 may condense these sub-nodes into one sub-node that represents path 451, as described above.

Figure 12:
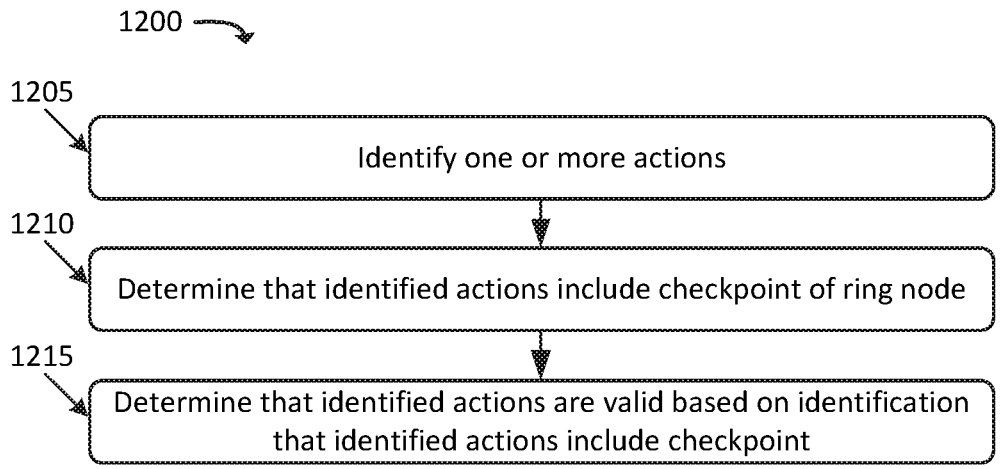
FIG. 12 illustrates an example process for determining whether a set of actions are valid based on comparison with attributes of a ring node.

FIG. 12 illustrates an example process 1200 for using a ring node to validate a set of actions. In some embodiments, process 1200 may be performed by CMS 310. In some embodiments, process 1200 may be performed by one or more other devices in addition to, or in lieu of, CMS 310.

As shown, process 1200 may include identifying (at 1205) one or more actions. For instance, CMS 310 may receive information regarding a set of user interactions detected or received by a system, a set of operations or computations programmatically performed by an automated system (e.g., a scripted process or a process performed by an artificial intelligence- and/or machine learning-based system), or a combination thereof.

Process 1200 may also include determining (at 1210) that the identified actions include a checkpoint of a ring node. For example, CMS 310 may store information regarding one or more ring nodes, which may have been generated according to process 1000 and/or by way of some other technique. CMS 310 may compare attributes of one or more of the identified actions to one or more checkpoints associated with the ring nodes, in order to identify a particular ring node that has a checkpoint with attributes that match the attributes of the one or more identified actions. For example, CMS 310 may receive information regarding a programmatically performed set of actions that simulates the logging out from a profile page (e.g., similar to the examples described above with respect to FIG. 1A or 1B). CMS 310 may determine that the set of actions includes the checkpoint associated with a given ring node, assuming that the checkpoint represents a successful logout from a profile page.

Process 1200 may further include determining (at 1215) that the identified actions are valid based on the identification that the identified actions include the checkpoint. For example, CMS 310 regardless of the other actions in the identified set of actions, CMS 310 may determine that the set of actions are valid based on the set of actions including the checkpoint. On the other hand, in situations where a given set of actions does not include an action that satisfies a checkpoint, CMS 310 may determine that the given set of actions is not valid. CMS 310 may store information regarding whether a given set of actions was valid or invalid, which may include refining a ring node or a sub-node of a ring node based on the determination of whether the given set of actions was valid or invalid. For example, as noted above, CMS 310 may increase or decrease a score associated with the set of actions based on whether the given set of actions was valid or invalid.

Figure 13:
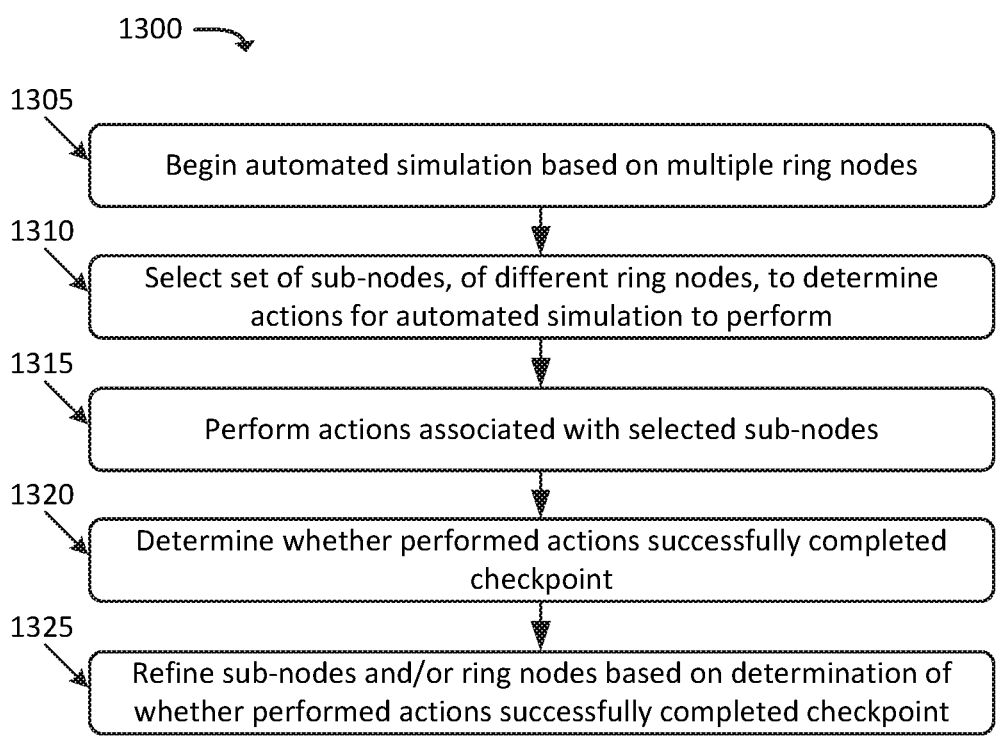
FIG. 13 illustrates an example process for refining ring nodes and building composite ring nodes using an iterative process.

FIG. 13 illustrates an example process 1300 for evaluating multiple different ring nodes based on the use of different sub-nodes (e.g., paths) of the ring nodes. While one iteration of process 1300 is shown in FIG. 13, some embodiments may perform some or all of process 1300 multiple times, such as 100 times, 100,000 times, or more. In some embodiments, process 1300 may be performed by CMS 310. In some embodiments, process 1300 may be performed by one or more other devices in addition to, or in lieu of, CMS 310. Process 1300, including multiple iterations of process 1300, is described with reference to FIGS. 14-17.

Figure 14:
FIGS. 14-17 conceptually illustrate aspects of the process shown in FIG. 13.

As shown, process 1300 may include beginning (at 1305) an automated simulation based on multiple ring nodes. For example, CMS 310 may initiate a scripted, machine learning-based, artificial intelligence-based, and/or some other type of automated process to reach a target checkpoint. CMS 310 may identify, for example, a given ring node that represents the completion of a target checkpoint. For example, as shown in FIG. 14, CMS 310 may store information regarding multiple ring nodes 1405-1430. Ring node 1405 may represent paths from a node (denoted in the figure as "N1") to a node N19 (e.g., N19 is a checkpoint of ring node 1405). Ring node 1410 may represent paths from node N19 to N27, and so on. In this example, assume that the target checkpoint for the automated simulation is N50. CMS 310 may identify that a checkpoint of ring node 1430 matches the target checkpoint. This identification is denoted in FIG. 14 as bold, dashed lines on ring node 1430.

Figure 15:
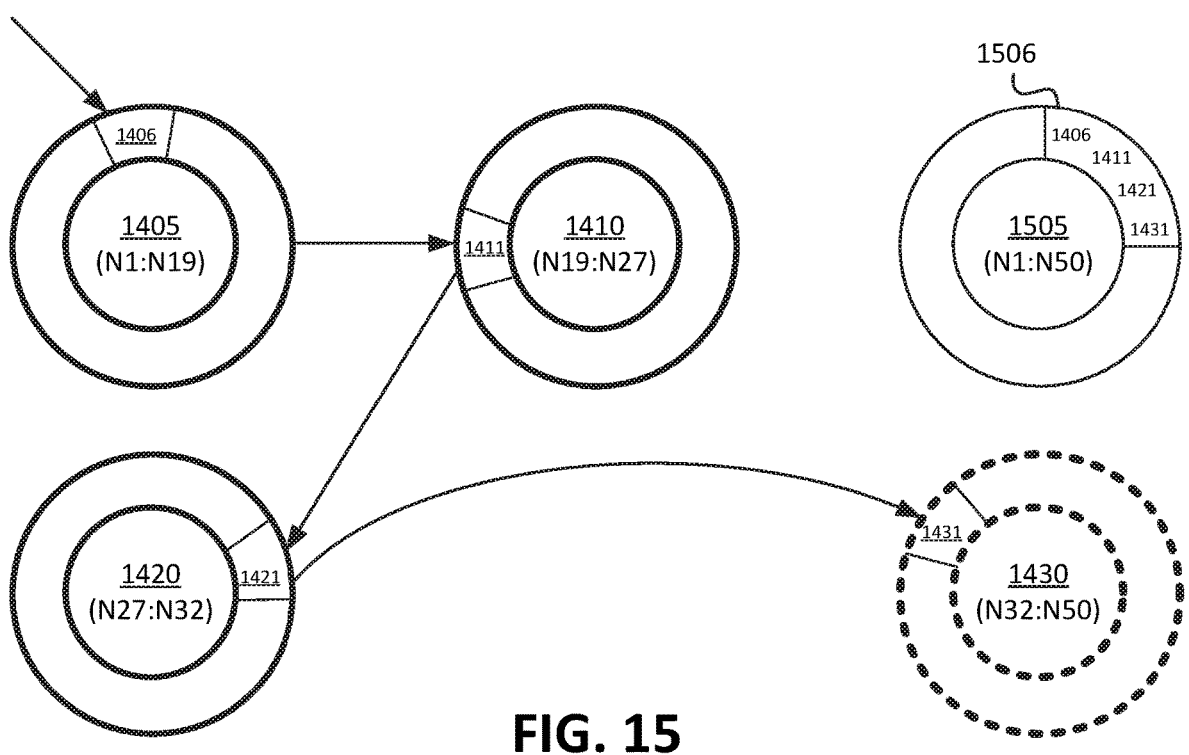

Process 1300 may also include selecting (at 1310) a set of sub-nodes, of different ring nodes, to determine actions for the automated simulation to perform. For example, CMS 310 may identify one or more other ring nodes that form a path from a starting point (e.g., an initial stage of the simulation, or a specified starting point in the simulation) of one ring node to the ring node that includes the target checkpoint. Referring to FIG. 15, CMS 310 may identify that ring node 1405 includes the starting point (N1, in this example). CMS 310 may further identify that a path may be formed from ring node 1405 to ring node 1410, from ring node 1410 to ring node 1420, and from ring node 1420 to ring node 1430. For instance, as shown in FIG. 15, the checkpoint of ring node 1405 may match a starting node of ring node 1410 (i.e., N19, in this example), the checkpoint of ring node 1410 may match the starting node of ring node 1420 (i.e., N27, in this example), and so on.

Additionally, CMS 310 may identify that other ring nodes (i.e., ring nodes 1415 and 1425, in this example) are not in the path between the starting point (i.e., N1 in this example) and the target checkpoint (i.e., N50 in this example).

CMS 310 may select sub-nodes in each of the ring nodes in the identified path. In some embodiments, CMS 310 may select the sub-nodes based on scores and/or costs associated with the sub-nodes. For instance, as mentioned above, some sub-nodes may have higher scores and/or lower costs than other sub-nodes. In this example, CMS 310 may have selected sub-node 1406 of ring node 1405, sub-node 1411 of ring node 1410, sub-node 1421 of ring node 1420, and 1431 of ring node 1430 (e.g., based on these sub-nodes having the highest scores and/or lowest costs of their respective ring nodes).

Process 1300 may further include performing (at 1315) the actions associated with the selected sub-nodes. For example, CMS 310 may perform the actions, or attempt to perform the actions, indicated by the selected sub-nodes.

Process 1300 may additionally include determining (at 1320) whether the performed actions successfully completed a given checkpoint and refining (at 1325) one or more of the sub-nodes and/or the ring nodes based on the determination of whether the performed actions successfully completed the checkpoint. For example, when attempting to performing the actions, the simulation may fail (e.g., may not reach one or more of the checkpoints associated with one or more of the ring nodes 1405, 1410, 1420, or 1430). If the simulation fails, CMS 310 may determine that the specified set of sub-nodes are invalid to reach the target checkpoint (e.g., N50 in the example of FIGS. 14-17). On the other hand, if the simulation succeeds (e.g., the target checkpoint is reached), CMS 310 may determine that the specified set of sub-nodes are valid. CMS 310 may also generate or modify a score associated with the set of sub-nodes (e.g., may increase a score for the set of sub-nodes if the simulation succeeds). In this sense, the ring nodes may be used to train a machine learning model (e.g., using unsupervised learning), in which certain actions or sets of actions are represented by sub-nodes. For example, a ring node, or set of ring nodes, may be training data for a machine learning model, and performing actions (either according to existing sub-nodes, or to generate new sub-nodes (e.g., in accordance with example process 1300)) may be used to refine the model (e.g., to add sub-nodes, to condense sub-nodes, and/or to modify a score for sub-nodes).

In this manner, ring nodes may be themselves considered nodes for which paths can be evaluated, and another ring node may represent the paths between these ring nodes. In some embodiments, different sub-nodes may represent completely different techniques for reaching a target checkpoint. For example, referring again to FIG. 5, node 560 may represent the identification of a certain shape in an image (e.g., a purple rectangle). Path 501 may represent actions related to image recognition (e.g., identification of four corners of the shape, identification of purple pixels within the four corners, etc.), while path 503 may represent actions related to text parsing (e.g., identification of metadata of the image which may indicate that a purple rectangle is present in the image, parsing text that is located in a same graphical user interface as the image (e.g., a caption that states that the image includes a purple rectangle, etc.). Thus, as discussed herein, different sub-nodes of the same ring node may represent different techniques to reach the same classification, identification, etc. In some embodiments, a given sub-node may itself represent multiple different techniques, similar to the example discussed above with respect to FIGS. 4A and 4B.

Returning to FIG. 13, ring nodes may further be refined (at 1325) based on how many different paths (e.g., sub-nodes) of the ring node can be performed to reach the same checkpoint. For example, the automated simulation may perform actions according to multiple sub-nodes on the same set of data/the same environment. For instance, as discussed above, CMS 310 may perform image recognition on a graphical user interface that includes an image according to a first sub-node of a particular ring node (e.g., to use image recognition to identify an object depicted in the image), and may also perform text parsing on the graphical user interface according to a second sub-node of the same particular ring node (e.g., to use text-based and/or contextual parsing to identify an object depicted in the image). If both sub-nodes are valid, CMS 310 may increase a score of both sub-nodes, may generate or increase a score for the combination of the first and second sub-nodes (e.g., may increase a score for this combination, in relation to other sub-nodes, or in relation to the first and second sub-nodes themselves), my increase a score for the ring node itself (e.g., to indicate that the ring node itself has multiple valid paths), etc.

For example, ring node 1505, also shown in FIG. 15, may represent paths between N1 and N50. Assuming that the path illustrated here (e.g., traversing sub-nodes 1406, 1411, 1421, and 1431) is valid, CMS 310 may generate or modify 1505 to include sub-node 1506, which represents the path traversing sub-nodes 1406, 1411, 1421, and 1431. CMS 310 may also determine a cost, score, and/or other attributes of the path traversing sub-nodes 1406, 1411, 1421, and 1431, and include the cost, score, etc. in sub-node 1506.

Figure 16:
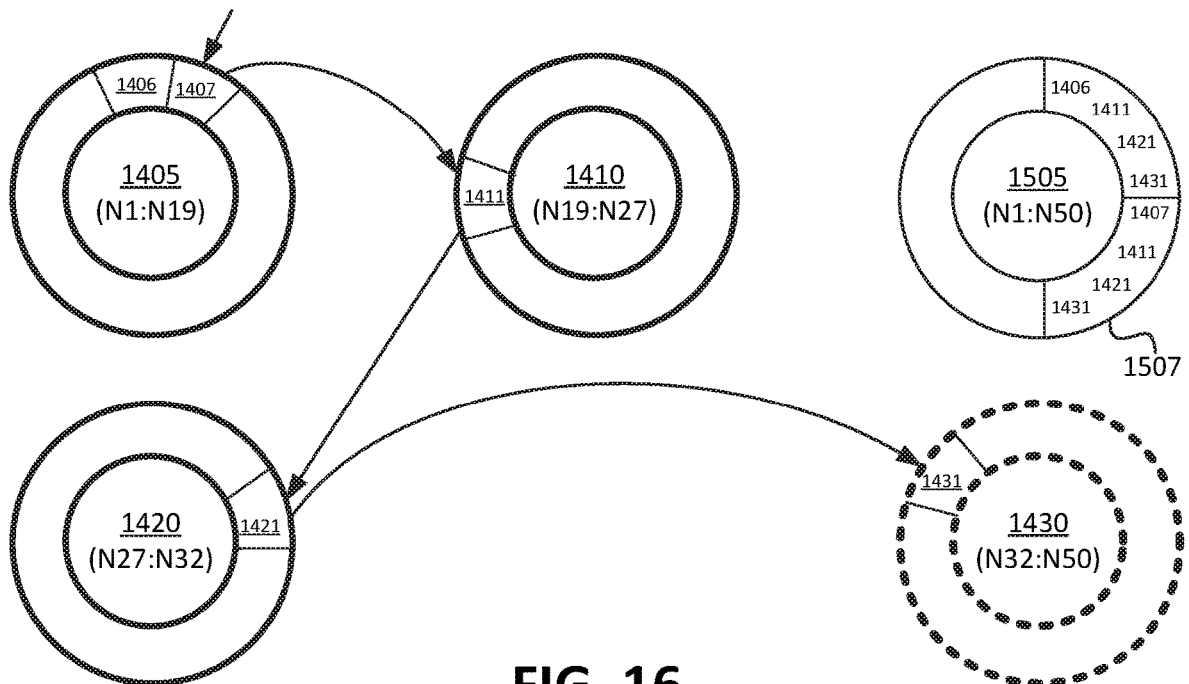
Figure 17:
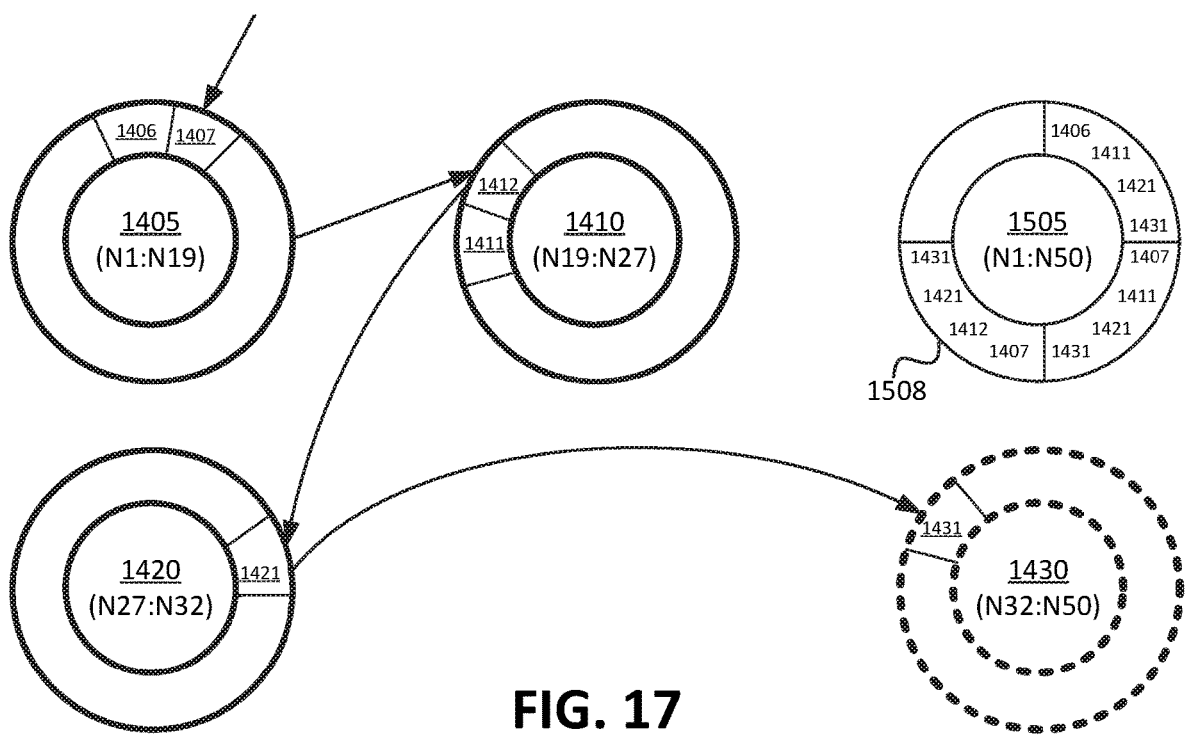

As mentioned above, process 1300 may be performed in an iterative fashion. For example, FIG. 16 illustrates an example of process 1300 being performed with a different sub-node of ring node 1405 (i.e., sub-node 1407 of ring node 1405, in this example). Assuming this path reaches the target checkpoint, CMS 310 may update ring node 1505 to include sub-node 1507, which represents the path traversing sub-nodes 1407, 1411, 1421, and 1431. Similarly, as shown in FIG. 17, assuming that another potential path (e.g., traversing sub-node 1406, sub-node 1412 of ring node 1410, sub-node 1421, and sub-node 1431) is valid, CMS 310 may update ring node 1505 to include sub-node 1508, which represents the path traversing sub-nodes 1406, 1412, 1421, and 1431.

Figure 18:
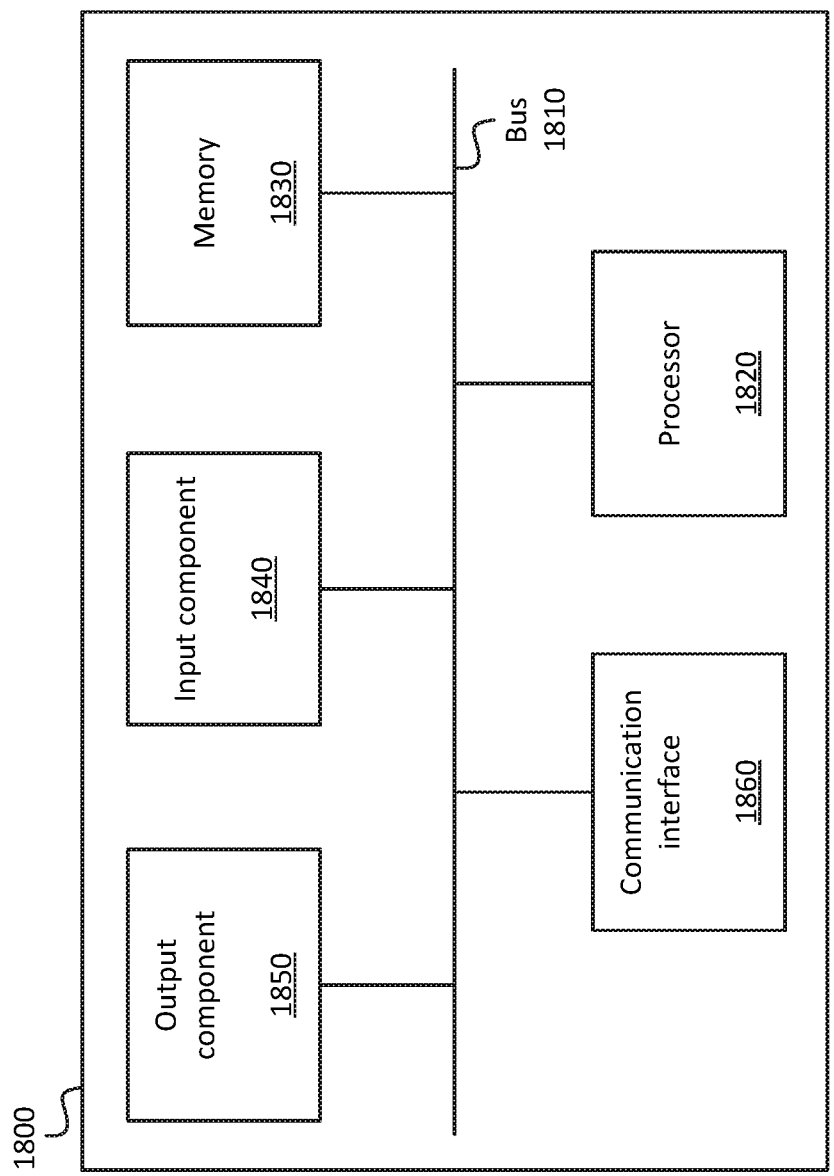
FIG. 18 illustrates example components of one or more devices, according to one or more embodiments described herein.

FIG. 18 illustrates example components of device 1800. One or more of the devices described above may include one or more devices 1800. Device 1800 may include bus 1810, processor 1820, memory 1830, input component 1840, output component 1850, and communication interface 1860. In another implementation, device 1800 may include additional, fewer, different, or differently arranged components.

Bus 1810 may include one or more communication paths that permit communication among the components of device 1800. Processor 1820 may include a processor, microprocessor, or processing logic that may interpret and execute instructions. Memory 1830 may include any type of dynamic storage device that may store information and instructions for execution by processor 1820, and/or any type of non-volatile storage device that may store information for use by processor 1820.

Input component 1840 may include a mechanism that permits an operator to input information to device 1800, such as a keyboard, a keypad, a button, a switch, etc. Output component 1850 may include a mechanism that outputs information to the operator, such as a display, a speaker, one or more light emitting diodes ("LEDs"), etc.

Communication interface 1860 may include any transceiver-like mechanism that enables device 1800 to communicate with other devices and/or systems. For example, communication interface 1860 may include an Ethernet interface, an optical interface, a coaxial interface, or the like. Communication interface 1860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1800 may include more than one communication interface 1860. For instance, device 1800 may include an optical interface and an Ethernet interface.

Device 1800 may perform certain operations relating to one or more processes described above. Device 1800 may perform these operations in response to processor 1820 executing software instructions stored in a computer-readable medium, such as memory 1830. A computer-readable medium may be defined as a non-transitory memory device. A memory device may include space within a single physical memory device or spread across multiple physical memory devices. The software instructions may be read into memory 1830 from another computer-readable medium or from another device. The software instructions stored in memory 1830 may cause processor 1820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 10-13, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   a non-transitory computer-readable medium storing a set of processor-executable instructions; and
   one or more processors configured to execute the set of processor-executable instructions, wherein executing the set of processor-executable instructions causes the one or more processors to:
   receive information specifying a set of criteria, the set of criteria including a beginning criteria and a checkpoint criteria, wherein the checkpoint criteria includes an identification of a graphical object in a graphical user interface;
   identify a first set of actions that satisfy the beginning criteria;
   perform the first set of actions, wherein performing the first set of actions includes using image recognition to identify one or more attributes of the graphical object in the graphical user interface;
   determine that performing the first set of actions satisfies the checkpoint criteria;
   store information indicating that the first set of actions satisfy the checkpoint criteria;
   identify a second set of actions that satisfy the beginning criteria, the first and second sets of actions including at least one different action;
   perform the second set of actions, wherein performing the second set of actions does not include using an image recognition technique to identify the one or more attributes of the graphical object in the graphical user interface;
   determine that performing the second set of actions satisfies the checkpoint criteria;
   store information indicating that the second set of actions satisfy the checkpoint criteria; and
   train a machine learning model that models actions that satisfy the beginning criteria and the checkpoint criteria, based on the stored information indicating that the first and second sets of actions satisfy the checkpoint criteria.

2. The device of claim 1, wherein the first set of actions includes a first sequence of actions, and wherein the second set of actions includes a different second sequence of actions.

3. The device of claim 1, wherein a particular action, of the first set of actions, includes one or more criteria that, when satisfied, indicate that the particular action has been performed.

4. The device of claim 1, wherein executing the processor-executable instructions, to train the machine learning model, further causes the one or more processors to:
- increase a score, associated with the first set of actions, based on determining that the first set of actions satisfy the checkpoint criteria; and
- select the first set of actions, based on the increased score for the first set of actions, when selecting between candidate sets of actions to perform when training the machine learning model.

5. The device of claim 1, wherein executing the processor-executable instructions further causes the one or more processors to:
- generate a graphical representation of the first and second sets of actions, wherein the graphical representation includes a first node that represents the first set of actions and a second node that represents the second set of actions; and
- present the graphical representation via a display device.

6. The device of claim 1, wherein executing the processor-executable instructions further includes:
- comparing the first set of actions to the second set of actions;
- determining, based on the comparing, one or more attributes of a first action, of the first set of actions, that have similarities and differences with one or more attributes of a second action of the second set of actions;
- condensing the first and second sets of actions into a third set of actions, wherein the third set of actions indicates the determined similarities and differences between the first action and the second action; and
- storing the third set of actions in lieu of the first and second sets of actions.

7. The device of claim 1, wherein executing the one or more processor-executable instructions further includes:
- based on determining that performing the first and second sets of actions satisfies the checkpoint criteria, identifying a third set of actions that includes an initial action that satisfies the same checkpoint criteria satisfied by the first and second sets of actions;
- based on identifying the third set of actions:
  - generating a first score based on performing the first set of actions and the third set of actions, and
  - generating a second score based on performing the second set of actions and the third set of actions;
- selecting, based on the generated first and second scores, a particular one of the first set of actions or the second set of actions; and
- further training the machine learning model to associate the third set of actions with the selected particular one of the first set of actions or the second set of actions.

8. A non-transitory computer-readable medium, storing a set of processor-executable instructions, which, when executed by one or more processors, cause the one or more processors to:
- receive information specifying a set of criteria, the set of criteria including a beginning criteria and a checkpoint criteria, wherein the checkpoint criteria includes an identification of a graphical object in a graphical user interface;
- identify a first set of actions that satisfy the beginning criteria;
- perform the first set of actions, wherein performing the first set of actions includes using image recognition to identify one or more attributes of the graphical object in the graphical user interface;
- determine that performing the first set of actions satisfies the checkpoint criteria;
- store information indicating that the first set of actions satisfy the checkpoint criteria;
- identify a second set of actions that satisfy the beginning criteria, the first and second sets of actions including at least one different action;
- perform the second set of actions, wherein performing the second set of actions does not include using an image recognition technique to identify the one or more attributes of the graphical object in the graphical user interface;
- determine that performing the second set of actions satisfies the checkpoint criteria;
- store information indicating that the second set of actions satisfy the checkpoint criteria; and
- train a machine learning model that models actions that satisfy the beginning criteria and the checkpoint criteria, based on the stored information indicating that the first and second sets of actions satisfy the checkpoint criteria.

9. The computer-readable medium of claim 8, wherein the first set of actions includes a first sequence of actions, and wherein the second set of actions includes a different second sequence of actions.

10. The computer-readable medium of claim 8, wherein a particular action, of the first set of actions, includes one or more criteria that, when satisfied, indicate that the particular action has been performed.

11. The computer-readable medium of claim 8, wherein the processor-executable instructions, to train the machine learning model, include processor-executable instructions to:
- increase a score, associated with the first set of actions, based on determining that the first set of actions satisfy the checkpoint criteria; and
- select the first set of actions, based on the increased score for the first set of actions, when selecting between candidate sets of actions to perform when training the machine learning model.

12. The computer-readable medium of claim 8, wherein the set of processor-executable instructions further include processor-executable instructions to:
- generate a graphical representation of the first and second sets of actions, wherein the graphical representation includes a first node that represents the first set of actions and a second node that represents the second set of actions; and
- present the graphical representation via a display device.

13. The computer-readable medium of claim 8, wherein the set of processor-executable instructions further include processor-executable instructions to:
- compare the first set of actions to the second set of actions;
- determine, based on the comparing, one or more attributes of a first action, of the first set of actions, that have similarities and differences with one or more attributes of a second action of the second set of actions;
- condense the first and second sets of actions into a third set of actions, wherein the third set of actions indicates the determined similarities and differences between the first action and the second action; and
- store the third set of actions in lieu of the first and second sets of actions.

14. A method, comprising:
receiving, by one or more processors of a device, information specifying a set of criteria, the set of criteria including a beginning criteria and a checkpoint criteria, wherein the checkpoint criteria includes an identification of a graphical object in a graphical user interface;

identifying, by the one or more processors of the device, a first set of actions that satisfy the beginning criteria;

performing, by the one or more processors of the device, the first set of actions, wherein performing the first set of actions further includes using image recognition to identify one or more attributes of the graphical object in the graphical user interface;

determining, by the one or more processors of the device, that performing the first set of actions satisfies the checkpoint criteria;

storing, by the one or more processors of the device, information indicating that the first set of actions satisfy the checkpoint criteria;

identifying, by the one or more processors of the device, a second set of actions that satisfy the beginning criteria, the first and second sets of actions including at least one different action;

performing, by the one or more processors of the device, the second set of actions, wherein performing the second set of actions does not include using an image recognition technique to identify the one or more attributes of the graphical object in the graphical user interface;

determining, by the one or more processors of the device, that performing the second set of actions satisfies the checkpoint criteria;

storing, by the one or more processors of the device, information indicating that the second set of actions satisfy the checkpoint criteria; and training, by the one or more processors of the device, a machine learning model that models actions that satisfy the beginning criteria and the checkpoint criteria, based on the stored information indicating that the first and second sets of actions satisfy the checkpoint criteria.

15. The method of claim 14, wherein the first set of actions includes a first sequence of actions, and wherein the second set of actions includes a different second sequence of actions.

16. The method of claim 14, wherein a particular action, of the first set of actions, includes one or more criteria that, when satisfied, indicate that the particular action has been performed.

17. The method of claim 14, wherein training the machine learning model includes:

increasing a score, associated with the first set of actions, based on determining that the first set of actions satisfy the checkpoint criteria; and selecting the first set of actions, based on the increased score for the first set of actions, when selecting between candidate sets of actions to perform when training the machine learning model.

18. The method of claim 14, further comprising:

generating a graphical representation of the first and second sets of actions, wherein the graphical representation includes a first node that represents the first set of actions and a second node that represents the second set of actions; and presenting the graphical representation via a display device.

19. The method of claim 14, further comprising:

comparing the first set of actions to the second set of actions;

determining, based on the comparing, one or more attributes of a first action, of the first set of actions, that have similarities and differences with one or more attributes of a second action of the second set of actions;

condensing the first and second sets of actions into a third set of actions, wherein the third set of actions indicates the determined similarities and differences between the first action and the second action; and storing the third set of actions in lieu of the first and second sets of actions.

20. The method of claim 14, further comprising:

based on determining that performing the first and second sets of actions satisfies the checkpoint criteria, identifying a third set of actions that includes an initial action that satisfies the same checkpoint criteria satisfied by the first and second sets of actions;

based on identifying the third set of actions:
generating a first score based on performing the first set of actions and the third set of actions, and
generating a second score based on performing the second set of actions and the third set of actions;

selecting, based on the generated first and second scores, a particular one of the first set of actions or the second set of actions; and further training the machine learning model to associate the third set of actions with the selected particular one of the first set of actions or the second set of actions.

\* \* \* \* \*